March 26, 1940.  W. H. HAIGH  2,195,366
PORTABLE TOOL TRAY
Filed April 21, 1938  2 Sheets-Sheet 2
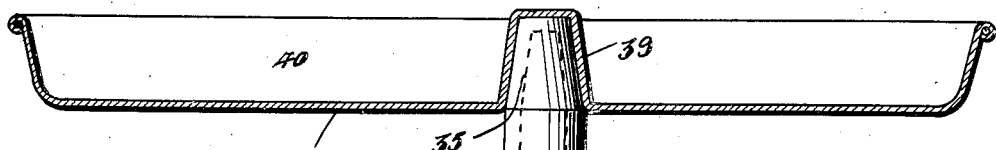
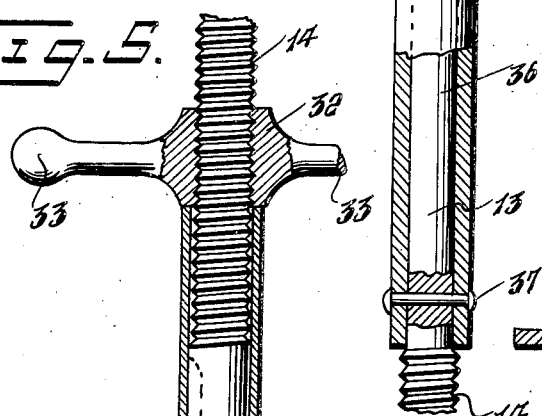
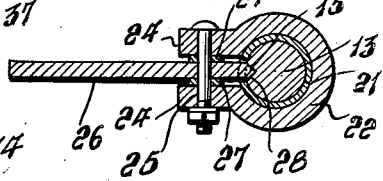
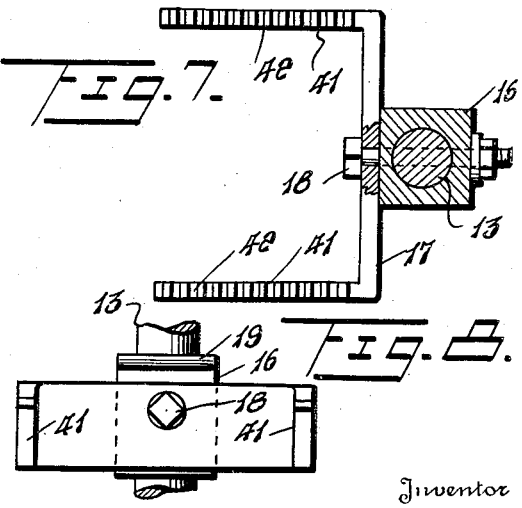
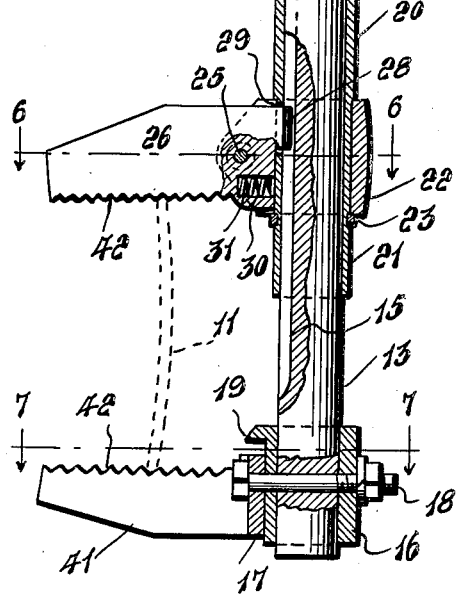
Inventor
W. H. Haigh
By L. F. Landreth
Attorney Patented Mar. 26, 1940

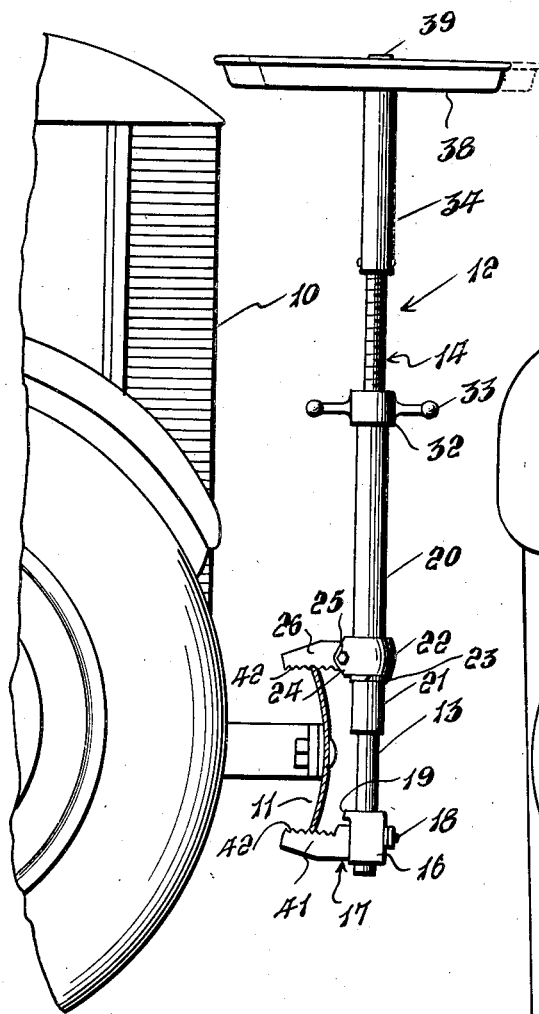
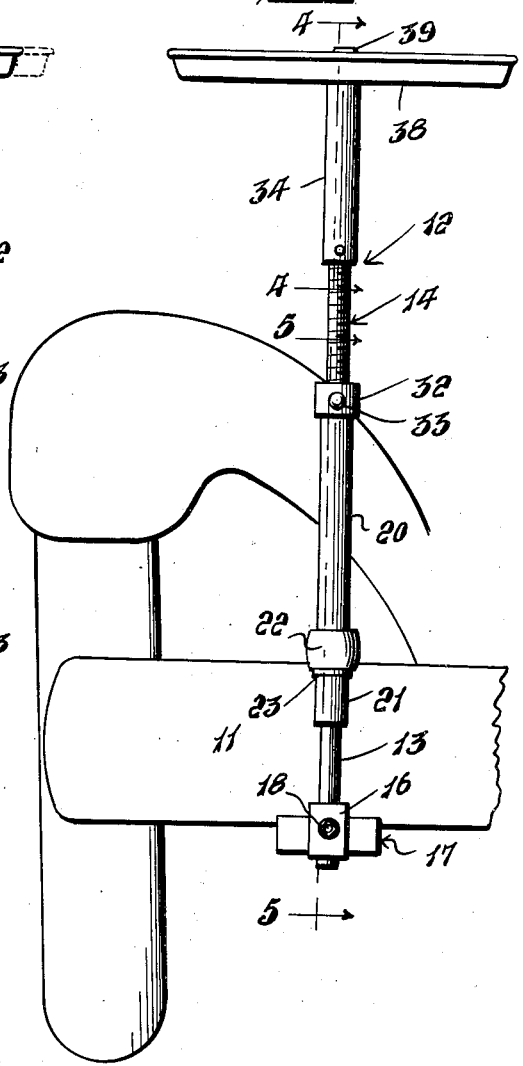
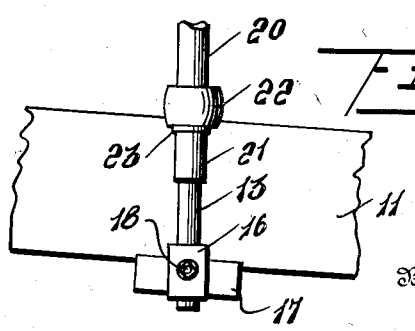

2,195,366

UNITED STATES PATENT OFFICE 2,195,366

PORTABLE TOOL TRAY

William H. Haigh, Oakland Beach, R. I.

Application April 21, 1938, Serial No. 203,455

3 Claims. (Cl. 248—226)

This invention relates to a portable tool tray adapted to be removably clamped to a motor vehicle bumper to support and retain the tray in a convenient position for holding tools and parts used in repairing a motor vehicle.

It is a particular aim of this invention to provide a general utility tray on which tools and mechanical parts may be conveniently held, said tray being eccentrically mounted to permit it to be turned toward or away from the vehicle depending upon the shape of the body and the space between the bumper and body.

It is a particular aim of this invention to provide a tray which may be located conveniently for mechanics working on an automobile or other motor vehicle and adapted to hold oily parts and tools which would otherwise be laid on the running board or cowl of the car thus preventing oil spots which mar the body finish.

A particular advantage of the invention resides in the fact that it eliminates the necessity of using a large tool box on small repair jobs; prevents the loss of parts removed for repair or replacement; and permits the carrying of a number of small parts and tools from place to place with ease by lifting the tray out of engagement with its supporting post.

Further objects and advantages of the invention will hereinafter become fully apparent from the following description of the drawings wherein a preferred form of the invention is illustrated and in which like reference characters throughout the various views represent like or corresponding parts.

In the drawings:

Figure 1 is a side elevational view showing the invention applied to the front bumper of an automobile, Figure 2 is a front elevational view of the same, Figure 3 is a fragmentary front elevational view similar to Figure 2 of the lower part of the post showing the jaws engaging the inclined portion of a vehicle bumper, Figures 4 and 5 are vertical sectional views taken on the lines 4—4 and 5—5 respectively of Figure 2, Figures 6 and 7 are horizontal sectional views taken on the lines 6—6 and 7—7 respectively of Figure 5, and Figure 8 is a front elevational view of the lower U-shaped jaw.

Referring more particularly to the drawings, 10 designates the radiator shell of a motor vehicle, and 11 its front bumper shown to illustrate the application of the invention which will hereinafter be described.

The invention designated generally 12 includes a post or standard 13 having an upper threaded portion 14 and a longitudinal groove 15. A collar 16 is mounted on post 13 adjacent to its lower end, and a U-shaped jaw 17 is held in engagement with one side of collar 16 and with post 13 by nut and bolt 18 which extend through the intermediate portion of jaw 17 and through collar 16 and the post 13. Jaw 17 is swively mounted on the bolt 18, but its movement is limited by an outwardly extending flange 19 on collar 16, for a purpose which will hereinafter be fully explained.

A sleeve 20 is slidably mounted on post 13 above collar 16, and is provided with a reduced lower portion 21 on which is mounted a collar 22 held in place by a retaining ring 23. Collar 22 is provided with a pair of spaced ears 24 through which extend a bolt 25 to pivotally mount a jaw 26. Bushings 27 are mounted on either side of jaw 26 as best seen in Figure 6, to space the jaw from the ears 24 to assure its freedom of movement. Jaw 26 is provided with a rearwardly extending projection in its upper part adapted to extend through a slot 29 of portion 21 and into groove 15. Groove 15 is V-shaped in cross-section, and portion 28 is tapered to an edge at its inner end to fit the groove 15, as best seen in Figure 6. A coil spring 30 is mounted in a recess 31 in the lower part of jaw 26, and normally urges the jaw upwardly to cause portion 28 to frictionally engage groove 15 to retain sleeve 20 and jaw 26 against movement relatively to the post.

A nut 32 having outwardly extending handles or knobs 33 is mounted on the threaded portion 14 of post 13, and bears against the upper end of sleeve 20 as best seen in Figure 5.

A cylindrical post head 34 having a tapered upper end 35 and a bore 36 opening in its lower end, is mounted on the upper end of the post 13 and retained in position thereon by a fastening 37. A tray 38 is provided with an upset recess 39 in its bottom, into which extends the end 35 of head 34 to swively and removably support tray 38. Recess 39 is offset from the center of the tray 38 as seen in Figure 4, for a purpose which will be hereafter explained. The tray 38 may be of any desired shape and is provided with an upwardly extending flange 40 of any conventional construction.

From the foregoing it will be seen, that jaw 26 may be adjusted relatively to jaw 17, so that the jaws will engage the opposite edges of a vehicle bumper 11. By turning nut 32 sleeve 20 may be moved downwardly to move jaw 26 toward jaw 17 to clamp the bumper 11 between the jaws. Jaw 17 which is U-shaped as best seen in Figure 7, has a pair of outwardly extending arms 41 forming the jaw elements which engage the bumper.

Jaws 17 and 26 are each provided with the notched or serrated faces 42 to securely engage the opposite edges of the bumper 11. Frequently the ends of a bumper 11 are inclined, so the jaw 17 is mounted to turn relatively to the post 13, as best seen in Figure 3, so that when the device is used with an inclined bumper 11 the post 13 will be supported in an upright position to mount the tray 38 in a horizontal position. Tray 38 is eccentrically mounted on end 35, so that should the radiator 10 of the vehicle project outwardly, the tray may be turned as indicated in Figure 1 to accommodate it to the shape of the radiator. In removing the device, nut 32 is first moved upwardly out of engagement with sleeve 20 after which sleeve 20 may be moved upwardly by pressing downwardly on the outer end of jaw 26 to hold portion 28 out of frictional engagement with groove 15.

Various changes and modifications in the construction and arrangement of the parts may obviously be made and are contemplated, and the right is therefore expressly reserved to make such variations and changes as do not depart from the spirit and scope of the invention as hereinafter defined by the appended claims.

I claim as my invention:

1. A device of the class described comprising a post, a jaw secured to the lower end of said post and adapted to engage the lower edge of a vehicle bumper, a sleeve slidably mounted on the post, a jaw pivotally mounted on the sleeve and adapted to engage the upper edge of the bumper, operating means for said sleeve to move the upper jaw into clamping engagement with the bumper, and means on the upper jaw extending through the sleeve to frictionally engage the post.

2. A motor vehicle tool tray support comprising a post having an intermediate threaded portion and a longitudinal groove, a U-shaped member secured to the lower end of said post having outwardly extending ends forming a lower jaw adapted to engage the lower edge of a vehicle bumper, a sleeve slidably mounted on said post, a jaw pivotally connected to said sleeve and adapted to engage the upper edge of the bumper, said last mentioned jaw having a projection extending into said groove, frictionally engaging same and normally holding the sleeve against movement relatively to the post, and operating means for said sleeve to move the jaws into clamping engagement.

3. In a tool tray and support, a post having an intermediate threaded portion, a U-shaped jaw member secured to the lower part of the post and adapted to engage the lower edge of a vehicle bumper, a sleeve slidably mounted on said post, a jaw pivotally connected to said sleeve and having an inwardly extending projection to engage the post, a coil spring normally urging said projection into engagement with the post to frictionally retain the sleeve in position, a wing-nut mounted on the threaded portion of the post and engaging one end of said sleeve to move said last mentioned jaw into clamping engagement with the upper edge of the bumper, and a tray having an upset recess in its bottom offset from the center thereof to receive the upper end of the post and to removably and swivelly mount the tray for adjustment relatively to the vehicle body.

WILLIAM H. HAIGH.